United States Patent
Meyer, Jr. et al.

[11] Patent Number: 6,101,023
[45] Date of Patent: Aug. 8, 2000

[54] LINE PERIODICALLY POLED LINBO₃ (PPLN) OPTICAL PARAMETRIC OSCILLATOR (OPO-DFG-OPO) WITH COMMON DOUBLY RESONANT CAVITY

[75] Inventors: Ronald K. Meyer, Jr., Chicago; Mohan Vaidyanathan, Algonguin; William Pekny, Schaumberg; Gerald P. Griffith, Western Springs, all of Ill.; Peter H. Mui, Fairfax, Va.

[73] Assignee: Northrop Grumman Corporation, Los Angeles, Calif.

[21] Appl. No.: 09/151,464

[22] Filed: Sep. 11, 1998

[51] Int. Cl.⁷ .................................................. G02F 1/39
[52] U.S. Cl. ............................................................ 359/330
[58] Field of Search ................................. 359/326–330; 372/21, 22

[56] References Cited

U.S. PATENT DOCUMENTS

| | | | |
|---|---|---|---|
| 4,992,750 | 2/1991 | Stewart | 330/4.3 |
| 5,027,361 | 6/1991 | Kozlovsky et al. | 372/22 |
| 5,033,057 | 7/1991 | Bosenberg et al. | 372/72 |
| 5,065,046 | 11/1991 | Guyer | 359/330 |
| 5,079,445 | 1/1992 | Guyer | 359/330 |
| 5,117,126 | 5/1992 | Geiger | 359/330 |
| 5,134,622 | 7/1992 | Deacon | 372/21 |
| 5,151,909 | 9/1992 | Davenport et al. | 372/22 |
| 5,191,587 | 3/1993 | Hanson et al. | 372/21 |
| 5,195,104 | 3/1993 | Geiger et al. | 372/97 |
| 5,227,911 | 7/1993 | Schiller et al. | 359/222 |
| 5,289,491 | 2/1994 | Dixon | 372/92 |
| 5,291,503 | 3/1994 | Geiger et al. | 372/21 |
| 5,355,247 | 10/1994 | Byer et al. | 359/330 |
| 5,377,219 | 12/1994 | Geiger | 372/97 |
| 5,412,674 | 5/1995 | Scheps | 372/22 |
| 5,561,550 | 10/1996 | Tanuma | 359/330 |
| 5,579,152 | 11/1996 | Ellingson et al. | 359/330 |
| 5,606,453 | 2/1997 | Walling et al. | 359/330 |
| 5,640,405 | 6/1997 | Wallace et al. | 372/21 |
| 5,673,281 | 9/1997 | Byer | 372/3 |
| 5,675,594 | 10/1997 | Hovis et al. | 372/22 |
| 5,682,397 | 10/1997 | Scheps | 372/22 |
| 5,696,778 | 12/1997 | MacPherson | 372/4 |
| 5,768,302 | 6/1998 | Wallace et al. | 372/21 |
| 6,016,214 | 1/2000 | Meyer, Jr. et al. | 359/330 X |

*Primary Examiner*—John D. Lee
*Attorney, Agent, or Firm*—Terry J. Anderson; Kalr J. Hoch, Jr.

[57] ABSTRACT

The present invention relates generally to the field of optical devices and particularly to embodiments of a three-stage PPLN optical parametric oscillator/difference-frequency generator configuration. The present invention allows simultaneous generation of three wavelengths in efficient use of the pump signal. The structure of the first embodiment of the present invention comprises a first PPLN element having first and second grating regions, and a second PPLN element having its own grating period. An input coupler is positioned at the input and exit ends of a resonator cavity and the first PPLN element is positioned between the input coupler and the second PPLN element. A second embodiment of the present invention includes a single PPLN element having three separate grating regions. The single PPLN element is positioned between input and output coupler mirrors. A third embodiment of the present invention includes a single PPLN element having three grating regions. The input and output couplers are affixed directly to the input and exit facets of the PPLN element.

17 Claims, 3 Drawing Sheets

LINE PERIODICALLY POLED LINBO₃ (PPLN) OPTICAL PARAMETRIC OSCILLATOR (OPO-DFG-OPO) WITH COMMON DOUBLY RESONANT CAVITY

FIELD OF THE INVENTION

The present invention relates generally to the field of optical devices, and particularly to embodiments of a three-stage PPLN optical parametric oscillator configuration. The present invention allows simultaneous generation of three wavelengths and efficient use of the pump signal.

BACKGROUND OF THE INVENTION

Production of adjustable coherent radiation through parametric amplification from a fixed frequency laser beam is effected through a device known as an optical parametric oscillator (OPO). The theoretical rational and complexities associated with parametric amplification and OPOs are well known to those skilled in the art.

In a conventional OPO, the OPO receives a beam of laser radiation at a pump frequency $\omega p$ from a pump source. The pump frequency $\omega p$ is received into a resonant optical cavity, wherein pump frequency $\omega p$ is directed through a nonlinear medium, usually a crystal, located within the resonant cavity. As a result, two lower energy signals are converted from the pump frequency $\omega p$ known as the signal frequency $\omega s$ and idler frequency $\omega i$.

The periodicity of the poling content and orientation of the crystal and the design of the resonant cavity determines the signal $\omega s$ and idler $\omega i$ frequencies. The feedback within the resonant cavity causes gain in the parametric waves, a process similar to build-up in a laser cavity. The cavity can either be singly resonant in which end mirrors reflect only signal frequency $\omega s$, or doubly resonant in which end mirrors reflect both signal $\omega s$ and idler $\omega i$ frequencies. Input coupler mirrors of the OPO are transparent to the pump frequency $\omega p$.

Due to the nature of the nonlinear crystal and the conversion process, the pump frequency $\omega p$ is always higher than the frequency of the signal frequency $\omega s$ and idler $\omega i$ frequencies. The sum of the signal $\omega p$ and idler $\omega i$ frequencies is equal to the pump frequency $\omega p$.

Power and energy conversion efficiency of the idler frequency $\omega i$ generation in an OPO is limited by the quantum efficiency and photon efficiency. Since idler frequency $\omega i$ is less than half of the pump frequency $\omega p$, the quantum limit is always less than half and significantly more so when the idler frequency $\omega i$ is far from degeneracy. Furthermore, for pulsed OPOS, pump regeneration from signal $\omega s$ and idler $\omega p$ frequency reduces photon conversion efficiency due by temporally and/or spatially varying pump radiation. Nevertheless, idler $\omega i$ output provides a useful means of generating coherent radiation in spectral regions that are difficult to access by other sources.

There are a variety of types of crystals that may be used in OPOs for various spectral regions. In particular, nonlinear optical crystals capable of producing parametric output which have been developed for commercial applications, include, but are not limited to, potassium tetanal phosphate (KTP), potassium tetanal arsenate (KTA), lithium niobate ($LiNbO_3$), potassium niobate ($KNbO_3$), silver gallium selenite ($AgGaSe_2$), and silver gallium sulfide ($AgGaS_2$). When a fixed laser is used to generate tunable waves from certain crystals, an electric field may be applied to the crystal, or the crystal may be temperature or angle tuned, or a combination of electrical voltage, temperature and/or angle tuning may be required (M. M. Fejer, G. A. Mabel, D. H. Jundt and R. L. Byer, "Quasi-Phase-Matched Second Harmonic Generation: Tuning And Tolerances,"0 IEEE J. Quantum Elecron; Vol. 28, pp. 2631, 1992).

Periodically poled $LiNbO_3$ (PPLN) has been shown to be particularly well-suited for OPO wavelength generation in the 1.4–4.0 $\mu$m region due to its low threshold, large non-linear coefficient, large acceptance angles, absence of walk-off, and transparency in this region (L. E. Myers, R. C. Eckardt, M. M. Fejer, R. L. Byer, W. R. Bosenberg, and J. W. Pierce, J. Opt. Soc. Am. B, Vol. 12, pp. 2102–2116 (1995)). Although continuous wave OPOs utilizing PPLN have demonstrated high conversion efficiencies (W. R. Bosenberg, A. Drobshoff, J. I. Alexander, L. E. Myers, and R. L. Byer, Opt.Lett. 21, 1336–1338 (1996)), typically pulsed OPOs have not yet approached continuous wave OPO efficiencies due to factors such as back conversion of the pump wave and nonuniform pump depletion.

In typical configuration of an OPO using a crystal or PPLN medium, the crystal or PPLN is located between the two cavity mirrors. A light is directed through the entry mirror through the crystal or PPLN medium and through the exit mirror with certain frequencies being reflected back into the cavity to again be transmitted through the crystal or PPLN medium.

Other techniques of increasing conversion efficiency in similar OPO configurations suggest the inclusion of a second crystal or PPLN medium located within the cavity, and situated between the two cavity mirrors. In these structures, an entry mirror receives the light which directs the beam through a first crystal or PPLN to be received by a second crystal or PPLN and then on to an exit mirror. Again, the exit mirror transmits certain frequencies while reflecting other frequencies back through the crystal media.

Conversion schemes using tandem and intracavity difference frequency mixing (DFM) OPOs have been proposed and analyzed (K. Koch, G. T. Moore, and E. C. Cheung, J. Opt. Soc. Am. B, Vol. 12, pp. 2268–2273 (1995); and G. T. Moore and K. Koch, "The Tandem Optical Parametric Oscillator" IEEE J. Quantum Electron., Vol. 32, pp. 2085–2094 (1996)) and such configurations may help mitigate some of the limitations inherent in pulsed OPOs, however, such suggested approaches fail to significantly increase conversion efficiency.

Increased signal conversion schemes utilizing multiple crystals within the cavity demonstrating the OPO-DFM concept applying two separate PPLN crystals are discussed and analyzed in J. M. Fukumoto, H. Komine, W. H. Long and E. A. Stapperts, "Periodically Poled $LiNbO_3$ Optical Parametric Oscillator With Intracavity Frequency Mixing," presented at Advanced Solid State Lasers (1998) (Optical Society of America, Washington, D.C.) (See also L. E. Myers, G. D. Miller, R. C. Eckardt, M. M. Fejer and R. L. Byer, "Quasi-Phase-Matched 1.064 $\mu$m-Pumped Optical Parametric Oscillator In Bulk Periodically Poled $LiNbO_3$", Opt. Lett. Vol. 20, pp. 52, 1995).

Reference may be made to the following patents for further information concerning the state of the technology relating to OPOs (all of the references are incorporated herein by reference):

U.S. Pat. No. 5,400,173, issued Mar. 21, 1995 entitled "Tunable Mid-Infrared Wavelength Converter Using Cascaded Parametric Oscillators" to Komine, describes an apparatus for converting a fixed wavelength signal into a plurality of spectral output beams. The first resonator is coupled to a first nonlinear optical crystal for turning said first and second output beams.

U.S. Pat. No. 5,500,865, issued Mar. 19, 1996 entitled "Phased Cascading Of Multiple Nonlinear Optical Elements For Frequency Conversion", to Chakmakjian, uses two or more crystals in tandem to increase the interaction length of the nonlinear optical process for improved efficiency. Additional optical components are inserted into the optical path to adjust the phase delay of the interacting waves in order to maintain coherent generation of the product radiation.

U.S. Pat. No. 4,639,923, issued Jan. 27, 1987, entitled, "Optical Parametric Oscillator Using Urea Crystal", to Tang, et al., uses a crystal of urea as the nonlinear optical medium for constructing an OPO.

U.S. Pat. No. 5,159,487, issued Oct. 27, 1992, entitled "Optical Parametric Oscillator OPO Having A Variable Line Narrowed Output", to Geiger et al., describes an OPO that includes a pump laser for producing a pump beam; an optical resonator; an OPO crystal disposed within the optical resonator aligned with and responsive to the pump beam to produce a parametrically generated output; and a device external to the optical resonator for line narrowing the parametrically generated output.

U.S. Pat. No. 5,144,630, issued Sep. 1, 1992, entitled "Multiwavelength Solid State Laser Using Frequency Conversion Technique", to Lin, describes an apparatus for producing multiwavelength coherent radiations ranging from deep ultraviolet to mid-infrared. The basic laser is a pulsed Nd:YAG or Nd:YLF laser which is frequency converted by a set of novel nonlinear crystals including DCDA, LBO, BBO, KTP and $KNBO_3$ where efficient schemes using noncritical phase matching and cylindrical focussing are employed.

U.S. Pat. No. 5,117,126, issued May 26, 1992, entitled "Stacked Optical Parametric Oscillator", to Geiger, describes a stacked OPO wherein two optical parametric crystals are coaxially disposed in a single resonator, Incident radiation is coupled to the resonator and causes parametric oscillations of the two crystals. The two crystals are independently tuned, such as by angular orientation to produce distinct components of secondary radiation.

U.S. Pat. No. 5,079,445, issued Jan. 7, 1992, entitled "High Output Coupling Cavity Design For Optical Parametric Oscillators", to Guyer, discloses a cavity design for use with a nonlinear medium which may be used as an oscillator using pump energy with frequency (FP) interacting with the nonlinear medium for parametrically generating outputs having a signal frequency (FS) and an idler frequency (FI). The parametric radiation which is produced satisfy the relationship which is common for optical parametric amplifiers and oscillators FP=FS+FI.

U.S. Pat. No. 5,070,260, issued Dec. 3, 1991, entitled "Ultrahigh-Resolution Optical Parametric Oscillator Frequency Measurement and Synthesis System", to Wong, discloses one or more OPOs which are arranged selectively, singly, serially, and/or in parallel and each OPO is responsive to an input pump beam having a fractional stability to produce output signals and idler beams having fractional stabilities that correspond to or are better than the fractional stability of the pump beam and in such a way that the sum of the frequencies of the output signal and idler beams of each OPO is constrained to be equal to the frequency of the input beam thereof.

U.S. Pat. No. 5,047,668, issued Sep. 10, 1991, entitled "Optical Walkoff Compensation In Critically Phase-Matched Three-Wave Frequency Conversion Systems". to Bosenberg, discloses a walkoff-compensation frequency conversion system such as an OPO including a pair of nonlinear crystals such as: Beta-Barium Metaborate, aligned in an optical cavity with their optical axis at an angle with respect to the axis of the cavity.

U.S. Pat. No. 4,884,277, issued Nov. 28, 1989, to Anthon, et al., discloses an intracavity frequency-modified laser of improved amplitude stability which is obtained through the use of a plurality of nonlinear optical crystals within the laser cavity.

It is evident that it would be desirable to overcome the disadvantages of the stated art by providing an apparatus that allow simultaneous generation of three wavelengths in an efficient manner. Generation of additional wavelengths by recycling the undepleted pump would be useful in several applications.

SUMMARY OF THE INVENTION

It is therefore the object of the present invention to provide an OPO-DFM-OPO structure for the purpose of increasing the conversion efficiency from the pump frequency $\omega p$ while also providing a structure to simultaneously generate three wavelengths. The OPO-DFM-OPO structure is desirable as it generates an additional wavelength by recycling the undepleted pump $\omega p$. In previous PPLN schemes the undepleted pump was wasted.

The PPLN OPO-DFM-OPO structure of the present invention is useful in applications including, but not limited to, atmospheric sensing, pollution control, windshear sensing, LIDAR and free-space communication. The present invention may be useful as a multi-spectral source for various functions or as a variant in IRCM lasers.

The first embodiment of the present invention is an intracavity three-stage parametric oscillator/difference-frequency structure for generation of three separate wavelengths and efficient pump to idler wave conversion. An optical pump source provides a pump beam at a primary wavelength. A first optical medium is disposed in a single resonant cavity having an input end and an output end. The first optical medium sustains optical parametric oscillation and difference-frequency mixing by having a first region having a first grating period and a second region having a second grating period. The first PPLN element produces a first signal frequency, a first idler frequency and a first difference-frequency.

Disposed within the cavity, between the first PPLN element and an output mirror, is a second PPLN element which includes a single grating. The single grating acts as an OPO and produces a second idler frequency and a signal frequency.

An input mirror is positioned at the input end of the cavity and is adapted to couple the pump beam into the resonator cavity through the first and second non-linear optical mediums and is further adapted to be reflective of the first and second signal frequencies to resonate said signal frequencies within the cavity, while allowing passage of the pump beam into the cavity. An output mirror is positioned at the output end of the cavity and is adapted to couple the first difference-frequency and the first and second idler frequencies external to the cavity, thus producing three output frequencies. The output mirror is further adapted to be reflective of the first and second frequencies to allow resonance of the first and second signal frequencies within the cavity. The output mirror may, additionally be coated for high reflection of the pump to enable a second pass of the pump.

In the preferred embodiment, the first and second optical mediums are PPLN crystals that are held at a temperature between 395 k° and 400 k°. The first region of the first PPLN element has a grating period of 28.3 µm and the second region has a grating period of 32.22 µm. The second PPLN element has a grating period of 29.7 µm. The input mirror includes a high-reflective coating of 98% R of the first single wavelength and a high-transmission coating of 90% for the pump wavelength. The output mirror is coated for a 98% R of the first signal wavelength and a high-transmission of greater than 90% of the idler frequency. Both the input and output mirrors include coatings adapted for high reflectivity of greater than 90% of the first and second signal wavelengths.

The structure of the first embodiment of the present invention produces a first idler frequency of 3.95 µm, a first signal frequency of 1.46 µm and a first difference-frequency of 2.3 µm. In addition, the second idler frequency of 3.3 µm is produced as well as a second signal frequency of 1.57 µm.

A second embodiment of the present invention comprises an optical pump source for providing a pump beam, and a monolithic non-linear optical medium having first, second and third regions each including separate grating periods located within a single resonator. The first region of the monolithic PPLN has a first grating period adapted to operate as an optical parametric oscillator. The second region of the PPLN has a second grating period adapted to operate as a difference-frequency mixer. The third region of the PPLN is adapted to operate as an optical parametric oscillator, and includes its own separate grating period. All three regions are formed on a single substrate to form a monolithic crystal. An input mirror is positioned at the input end of the cavity and is adapted to couple the pump beam into the resonator cavity through the monolithic nonlinear optical medium. An output mirror is positioned at the output end of the cavity.

The structure of the second embodiment of the present invention produces first and second idler frequencies, first and second signal frequencies and a difference-frequency. Both the input and output couplers are adapted to be reflective of the signal frequencies to allow resonance of both signal frequencies within the cavity. The output coupler is adapted to allow passage of the first idler, second idler and difference frequency to output three separate frequencies.

A third embodiment of the present invention comprises a monolithic PPLN element having first, second and third regions. The first and second regions are adapted to operate as an OPO-DFM structure to produce a first signal frequency, a first idler frequency and a difference-frequency. The third region is formed with the OPO-DFM on a single substrate in series with the first two regions, and has a grating adapted to operate as an OPO, thus producing a second idler frequency and a separate signal frequency.

A input coupler and output coupler are formed by the placement of a coating on the input facet and exit facets of the PPLN element. The input coating is a thin film which acts as a mirror. The mirror allows passage of the pump signal into the PPLN element. The input coating and the output coating are reflective of the first and second signal frequencies allowing resonation of those frequencies within the cavity. The output coating allows passage of the first idler, the second idler and the difference-frequency to pass external to the cavity to output three separate wavelengths.

It should be noted and understood that with respect to the embodiments of the present invention, the materials suggested may be modified or substituted to achieve the general overall resultant high efficiency. The substitution of materials or dimensions remain within the spirit and scope of the present invention. In an embodiment, the periodicity of the periodically poled structure may also be varied to produce different wavelengths.

DETAILED DESCRIPTION OF THE PREFERRED EMBODIMENTS

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments. It is understood, however, that the same or equivalent functions and sequences may be accomplished by different embodiments and that they are also intended to be encompassed within the scope of this invention.

Figure 1:
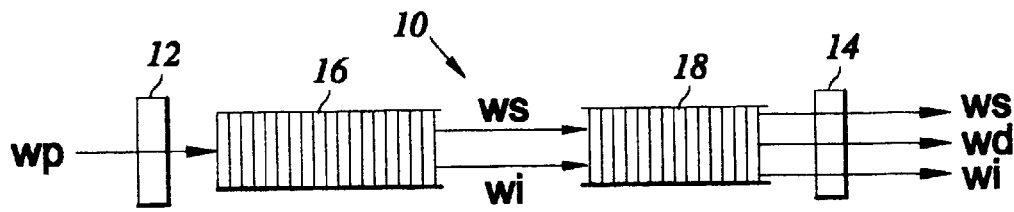
FIG. 1 is a schematic block diagram of a known OPO-DFM device.

Referring specifically to FIG. 1, there is shown a known intracavity difference-frequency mixing optical parametric oscillator 10 which produces signal frequency ωs, difference-frequency ωd and idler frequency ωi. The resonant cavity is defined by the input mirror 12 and the output mirror 14. Coaxially disposed within the cavity is a nonlinear crystal 16 which acts an Optical Parametric Oscillator (OPO) to produce signal frequency ωs and idler frequency ωi from the pump signal ωp. A second nonlinear crystal 18 is provided to effectuate difference-frequency mixing and to operate as a difference-frequency mixer (DFM) to produce a difference-frequency ωd and signal frequency ωs and idler frequency ωi. Thus, the structure shown in FIG. 1 is a OPO-DFM structure.

In operation, a pump source (not shown) provides a pump signal ωp into the resonant cavity through the input mirror 12. The beam is directed through the input mirror 12 onto the first nonlinear crystal 16 to produce signal wave ωs and idler wave ωi. Signal frequency ωs and idler frequency ωi is received by the second nonlinear crystal 18 which act as a DFM to produce a difference-frequency ωd along with signal frequency ωs and idler frequency ωi. Because the second nonlinear crystal 18 which acts as a DFM is located within the cavity, output efficiency of the idler frequency is increased. The output mirror 14 reflects a portion of the signal frequency as feedback through the cavity to provide a phase matching with the idler frequency ωi and to increase output conversion. The output mirror 14, however, is not 100% reflective to the signal frequency as overdriving the OPO-DFM with signal frequency ωs may deleteriously effect idler frequency ωi to produce less efficiency. Variations on the prior art device shown in FIG. 1 include the coupling or forming of the OPO crystal and the DFM crystal on a single substrate.

Figure 2:
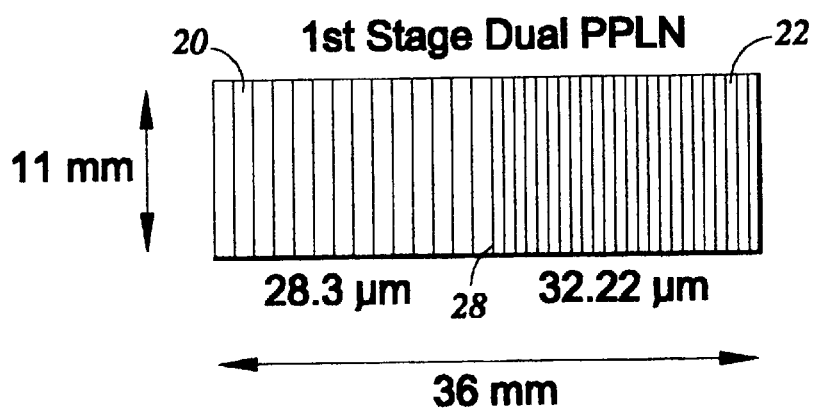
FIG. 2 is a schematic showing dimension and grating periods of a dual PPLN which is the first stage of the structure of the present invention.
Figure 3:
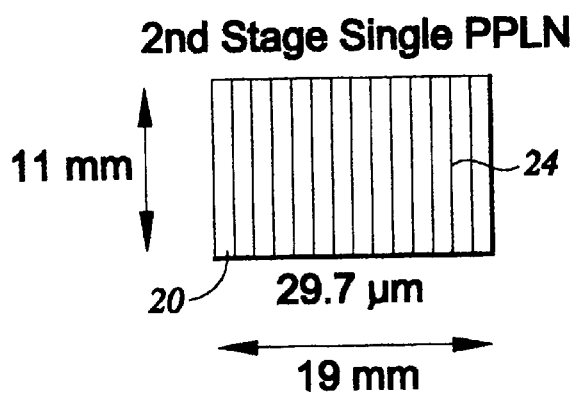
FIG. 3 is a schematic showing dimensions and the grating period of a PPLN which is the second stage of the structure of the present invention.
Figure 4:
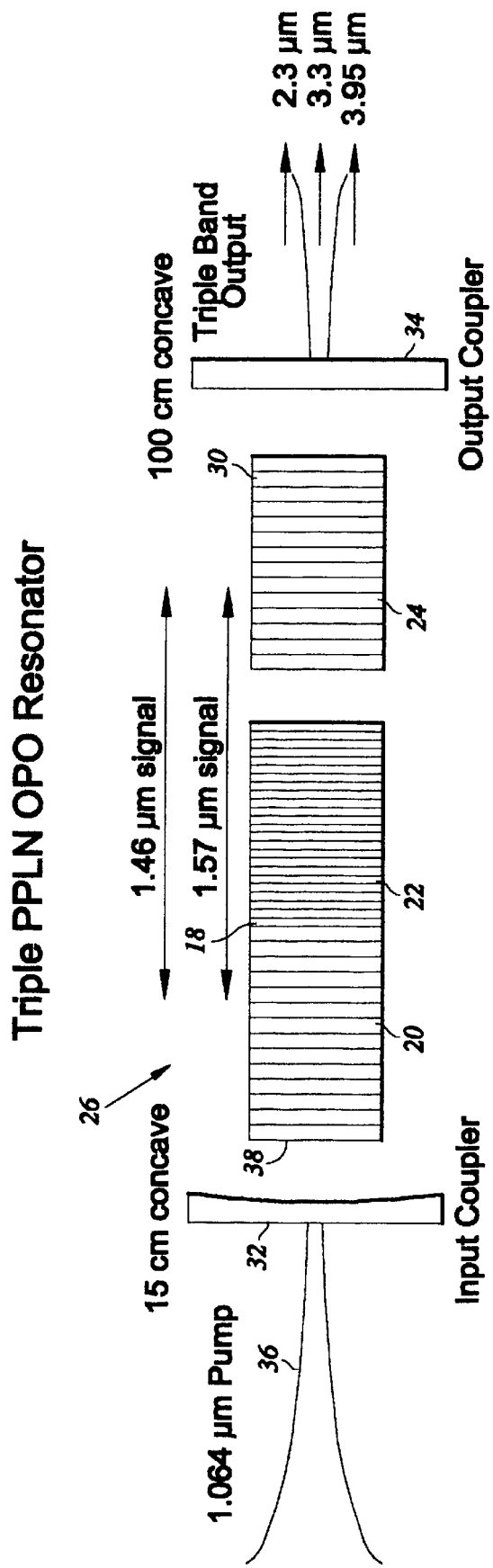
FIG. 4 is a schematic of the OPO-DFM-OPO structure within a resonator cavity of the present invention.

With an understanding of the modeling and experimental results of both the dual PPLN (OPO-DFM) and single OPO PPLN structure, the present invention proposes a three-stage PPLN as shown in FIGS. 2–4. Multiple stage periodically poled LiNbO$_3$ (PPLN) optical parametric oscillators (OPO) have been modeled and experimentally investigated. In the present invention, a dual PPLN 28 consisting of an OPO functional grating 20 and a DFM functional grating 22 is placed in series with a second OPO 30, having a single grating period 24. Both PPLN crystals are placed in a single common resonator cavity 26 to simultaneously produce two idler wavelengths and a difference-frequency wavelength. Thus, the present invention is structured as a OPO-DFM-OPO resonator consisting of a first PPLN element 28 (including OPO grating 20 and DFM grating 22) and a second PPLN element 30 (including OPO grating 24) in a single resonator 26.

Again referring specifically to FIGS. 2–4, there is shown the first embodiment of the present invention. In the first PPLN element 28, the first grating 20 includes a grating period of 28.3 μm. The second grating period 22 of the first PPLN element 28 comprises a grating period of 32.22 μm. As shown best in FIG. 2, the dimensions of the first PPLN element 28 is 11 mm in width and 36 mm in length, and 1 mm in thickness.

The second PPLN element 30 includes a grating period 24 of 29.7 μm. The dimensions as shown in FIG. 3 for the second PPLN element 30 is 11 mm in width and 19 mm in length, and 1 mm in thickness.

Referring specifically to FIG. 4, the first PPLN element 28 is positioned in the resonator cavity 26 between an input coupler 32 and the second PPLN element 30. An output coupler 34 is positioned at the output end of the resonator cavity 26. The input coupler 32 in the preferred embodiment comprises a 15 cm concave mirror and the output coupler 34 comprises a 100 cm concave mirror.

In operation, a 1.064 μm pump beam 36 is directed through the input coupler 32 and onto the input facet 38 of the first PPLN element 28. The beam is directed to the center of the input facet 38 and the pump beam is transmitted through the first grating period 20 which is adapted to operate as an OPO and to generate a first idler frequency of 3.95 μm. The second region 22 of the first PPLN element 28 operates as a DFM to produce difference-frequency which is 2.3 μm.

The remaining undepleted pump 36 exits the PPLN element 28, then passes into the second PPLN element 30, which is adapted to operate as an OPO and generates a second idler output of 3.3 μm. The output coupler allows passage of the 3.3 μm frequency. The output coupler also allows passage of the first idler frequency (3.95 μm) and the first difference-frequency (2.3 μm).

The first PPLN element additionally produces a signal frequency of 1.46 μm which is reflected by the output coupler and input coupler and which resonates within the cavity 26. The second PPLN element 30 produces a 1.57 μm signal which is also resonated within the cavity and is reflected by the input coupler 32 and the output coupler 34.

The pump source to produce the pump beam 36 may be a Continuum 50 Hz Nd:YAG laser generating up to 800 μJoules of 1.064 μm light. The light is focused to a beam waist of 100 μm being slightly elliptical in the transverse dimensions (ratio of semi-major to semi-minor axis did not exceed 1.3). The first PPLN element 28 is placed within the cavity 26 so that the beam waist of the pump resided in the center of the first PPLN 28 onto the center of the input facet 38. The second PPLN 30 functions as an OPO and is placed in series immediately following the first PPLN 28. The M$^2$ value did not exceed 1.5. The PPLN elements 28 and 30 were held at temperatures between 395 and 402 degrees Kelvin.

It is known that a single PPLN element 28 consisting of two grating periods in tandem acts as a optical parametric oscillator (OPO) and as a difference-frequency mixer (DFM) and may be described as a dual PPLN. In order to generate additional wavelengths, a second single stage (single period) PPLN 30, OPO is added in series with the dual PPLN 28. The dual PPLN 28 generates three wavelengths. A second OPO 30 is added in series to make use of the undepleted 1.064 μm pump passing through the dual PPLN 28. The second OPO 20 grating period 24 is designed to produce a second idler of 3.3 μm and a second signal of 1.57 μm.

The input coupler mirror 32 is coated for 98% reflectivity at the first signal wavelength (1.46 μm) and 90% transmission of the pump 36. The output coupler 34 was coated for 98% reflection for the first signal and high transmission (>90%) for the idler (3.9 μm). Both the input 32 and output 34 coupler mirrors have greater the 90% reflection at 1.57 μm (the second signal) as well, enabling resonance at two signal wavelengths. This feature allows operation as a double OPO with an intermediate DFM stage.

Figure 5:
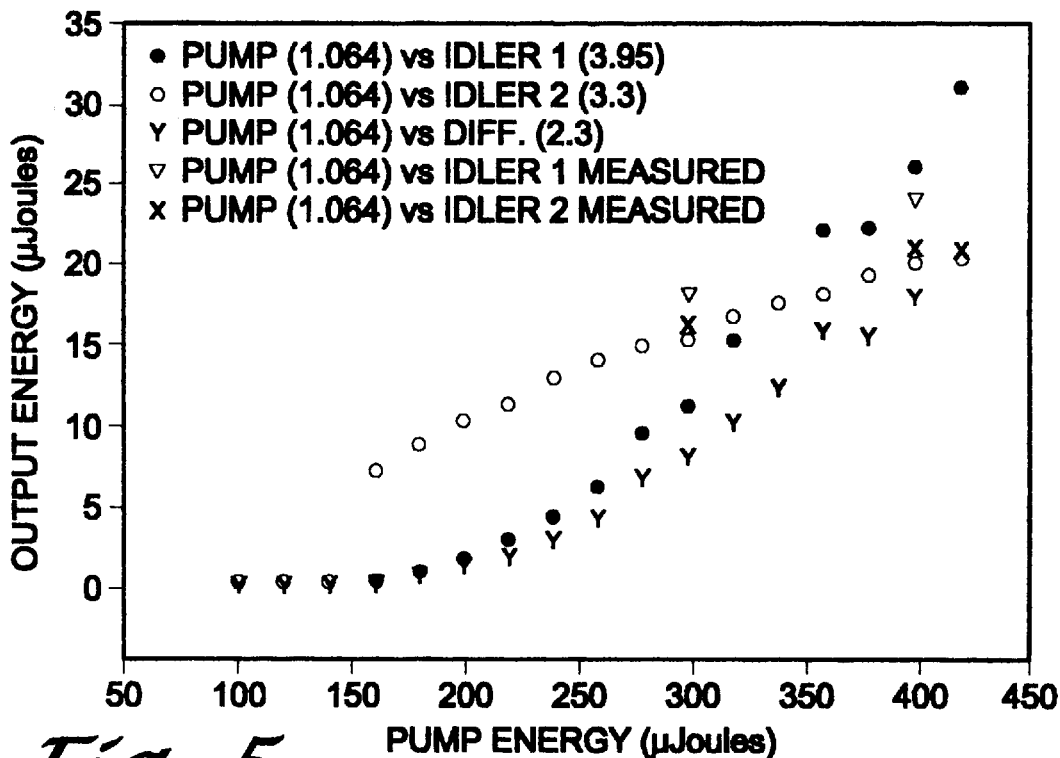
FIG. 5 is a graphical chart showing the input power versus the output power predicted in operation of the first embodiment of the present invention.

Predicted results of the structure of the first embodiment of the present invention shown in FIG. 4 are shown in the chart of FIG. 5. Using the configuration in FIG. 4, and a 1.064 μm pump energy between 50 and 400 μJoules, the first idler (3.95 μm), second idler (3.3 μm) and the first difference frequency energy were measured as illustrated in FIG. 5 by the solid triangles, open circles and solid circles, respectively.

The OPO-DFM-OPO PPLN resonator of the first embodiment of the present invention demonstrates, for the first time, the ability to simultaneously generate three wavelengths in the atmospheric absorption windows using PPLN of various grating periods. It does this by recycling the undepleted pump from the monolithic dual PPLN 28 to produce another wavelength in the atmospheric absorption window. In previous PPLN schemes, the undepleted pump was wasted. The ability to produce yet a third wavelength without an increase in pump energy is a true enhancement to the monolithic dual PPLN elements previously known.

Figure 6:
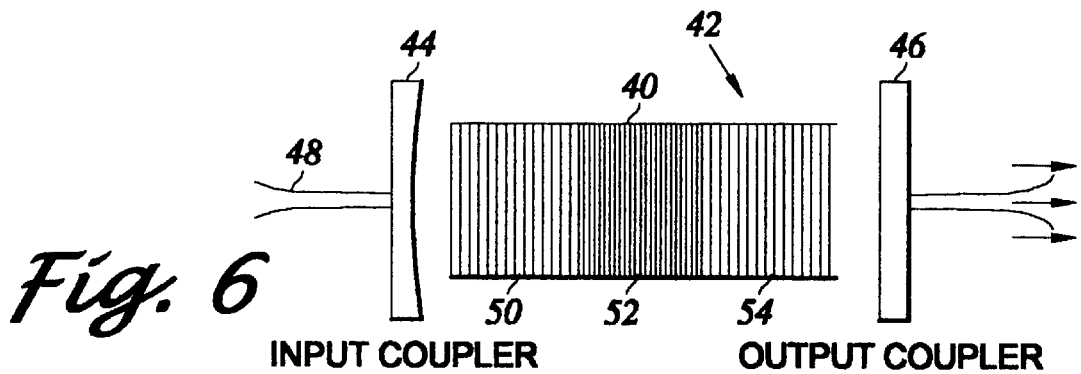
FIG. 6 is a schematic of a second embodiment of the present invention showing the OPO-DFM-OPO structure of the present invention wherein the first stage and second stage PPLN are formed on a single substrate.

A second embodiment of the present invention is shown in FIG. 6. Referring to FIG. 6, the second embodiment of the present invention includes a single monolithic PPLN element 40 located within a resonator cavity 42. The resonator cavity 42 is bounded by input coupler 44 and output coupler 46. The input coupler 44 and output coupler 46 are mirrors which are reflective to produced signal frequencies, but which allows passage of the input pump beam 48 and passage of output first and second idler wavelengths, as well as the difference-frequencies that are produced by the OPO-DFM-OPO structure of the PPLN element 40.

The PPLN element 40 comprises first region 50 having a first grating period, a second region 52 having a second grating period, and a third region 54 including a third grating period. The first region 50 and second region 52 operate as a dual OPO-DFM structure, which produces a first idler frequency, a first signal frequency and a difference-frequency. The third region 54 operates as a single OPO element which produces a second signal and second idler frequency. The monolithic PPLN structure 40 includes three separate regions 50, 52 and 54 formed on a single substrate. The structure of the second embodiment of the present invention is similar to the structure proposed by the first embodiment of the present invention, however, in the second embodiment of the present invention, the third region 54 is produced on a single substrate with the OPO-DFM structure including first and second regions 50 and 52, respectively.

Figure 7:
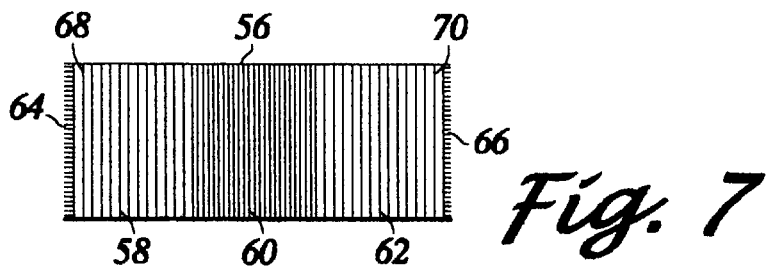
FIG. 7 is a schematic of a third embodiment of the present invention showing the OPO-DFM-OPO structure formed on a single substrate wherein the cavity mirrors are intrinsic with the surface of the PPLN.

A third embodiment of the present invention is shown in FIG. 7. Referring to FIG. 7, the third embodiment of the present invention comprises a monolithic three-stage PPLN structure 56, which includes a first region 58, a second region 60 and a third region 62. Each of the regions 58, 60, and 62 include separate grating periods. The configuration of the third embodiment of the present invention as shown in FIG. 7 is similar to the configuration shown in the second embodiment of the present invention shown in FIG. 6, however, the input and output couplers 64 and 66, respectively, are formed on the entrance facet 68 and the exit facet 70 of the PPLN element 56. In this regard, the entire resonator cavity is intrinsic with the PPLN element 56. Thus, a pump beam would pass through the input coupler 64 which is a coating affixed directly to the input facet 68 of the PPLN element 56 which passes through the OPO-DFM structure of the first and second regions 58 and 60. The input coupler 64 and output coupler 66 (also a thin film affixed to the exit facet 70 of the PPLN element 56) is reflective of a first signal frequency and allows resonation of that signal frequency within the cavity. An first idler signal frequency is produced and the output coupler 66 allows passage of that idler frequency, as well as the difference-frequency that is also produced. The third stage 62 produces a second idler frequency which is allowed to pass as it is transparent to the output coupler 66, however, the second signal frequency is reflected by the input coupler 64 and output coupler 66 and therefore is unaided within the cavity.

The third embodiment of the present invention is an enhancement to other structures which have external mirrors. The intrinsic mirror coatings 64 and 66 reduce weight and save space by eliminating additional elements such as mirrors and mirror mounts. External mirrors and mirror mounts increase the systems susceptibility to the effects of vibration encountered in flight and other applications. Furthermore, the intrinsic mirrors make the entire OPO simple to replace, mount and align.

Examples of OPO and DFM crystals of differing material that may be used with respect to the embodiments of the present invention include potassium tetanal phosphate ($KTiOPO_4$) and potassium or rubidium tetanal arsenate ($KTiOAsO_4$ or $RbTiOAsO_4$). These crystals use birefringent phase matching that involves a proper choice of propagation direction and polarization components. The birefringent phase matched DFM materials for the infrared region include silver gallium selenite ($AgGaSe_2$), silver gallium sulfide ($AgGaS_2$), gallium selenite (GaSe), and zinc germanium phosphide ($ZnGeP_2$). Gallium arsenide (GaAs) and zinc selenite (ZnSe) are candidates for DFM crystals based on quasi-phase matching, while periodically-poled lithium niobate (PPLN), periodically poled (PP) $KTiOPO_4$, PP $KTIOA_5O_4$ or $PP-RbTi_1OA_5O_4$ crystals can be used for a quasi-phase matched OPO.

For birefringent DFM crystals that require orthogonally polarized signal and idler components, the OPO crystal orientation and beam propagation are selected to satisfy that condition. For quasi-phase matched DFM crystals with parallel polarization components, the OPO crystal must provide signal and idler components with parallel polarizations. The optimum combination of materials depend on the wavelengths of the pump, signal, and idler radiation.

Additional modifications and improvements of the present invention may also be apparent to those skilled in the art. Thus, the particular combination of the parts described and illustrated herein is intended to represent only one embodiment of the present invention, and is not intended to serve as limitations of alternative devices within the spirit and scope of the invention.

What is claimed is:

1. An intracavity three-stage parametric oscillator/difference-frequency mixing structure for generation of three separate wavelengths and efficient pump to idler wave conversion comprising:
    (a) an optical pump source for providing a pump beam at a primary wavelength;
    (b) a singly resonant cavity having an input end and an output end;
    (c) a first optical medium disposed in said cavity for sustaining optical parametric oscillation and difference-frequency mixing from said pump beam, said first optical medium comprising:
        (i) a first region having a first grating period adapted to operate as an optical parametric oscillator; and
        (ii) a second region having a second grating period adapted to operate as a difference frequency mixer wherein said first and second regions are adapted to produce a first signal frequency, a first idler frequency and a first-difference frequency;
    (d) a second optical medium having a third grating period for sustaining optical parametric oscillation coaxially disposed in such cavity and positioned in series between said first optical medium and said output end of said cavity, wherein said second optical medium is adapted to produce a second signal frequency and a second idler frequency from undepleted pump frequency;
    (e) an input mirror positioned at the input end of said cavity, adapted to couple the pump beam into the resonant cavity through the first and second optical mediums and further adapted to be reflective of the first and second signal frequencies to resonate said first and second signal frequencies within the cavity; and
    (f) an output mirror positioned at the output end of said cavity, adapted to couple the first difference-frequency and the first and second idler frequencies external to the cavity, and further adapted to be reflective of a portion of the first and second signal frequencies to prevent overdriving and to resonate the remaining first and second signal frequencies within the cavity.

2. The three-stage intracavity optical parametric oscillator/difference-frequency mixing structure of claim 1 wherein said first optical medium is a PPLN crystal.

3. The three-stage intracavity optical parametric oscillator/difference-frequency mixing structure of claim 1 wherein said second optical medium is a PPLN crystal.

4. The three-stage intracavity optical parametric oscillator/difference-frequency mixing structure of claim 1 wherein said first region has a grating period of 28.3 $\mu$m and said second region has a grating period of 32.22 $\mu$m.

5. The three-stage intracavity optical parametric oscillator/difference-frequency mixing structure of claim 1 wherein said second optical medium has a grating period of 29.7 $\mu$m.

6. The three-stage intracavity optical parametric oscillator/difference-frequency mixing structure of claim 1 wherein said input mirror includes a high reflective coating of 98%R at the first signal wavelength at 1.46 $\mu$m and a high transmission coating of 90%T for the pump wavelength at 1.064 $\mu$m.

7. The three-stage intracavity optical parametric oscillator/difference-frequency mixing structure of claim 1 wherein said output mirror is coated for 98%R reflection of the first signal wavelength at 1.46 $\mu$m and high transmission of greater than 90%T for the idler wavelength at 3.9 $\mu$m.

8. The three-stage intracavity optical parametric oscillator/difference-frequency mixing structure of claim 1 wherein each of said input and output mirrors include coatings adapted for high reflectivity of greater than 90%T of the first and second signal wavelengths.

9. The three-stage intracavity optical parametric oscillator/difference-frequency mixing structure of claim 1 wherein said first optical medium and said second optical medium are held in a temperature range between 395 k° and 400 k°.

10. The three-stage intracavity optical parametric oscillator/difference-frequency mixing structure of claim 1 wherein said first idler frequency is 3.95 $\mu$m.

11. The three-stage intracavity optical parametric oscillator/difference-frequency structure of claim 1 wherein said first signal frequency is 1.46 $\mu$m.

12. The three-stage intracavity optical parametric oscillator/difference-frequency mixing structure of claim 1 wherein said first difference-frequency is 2.3 $\mu$m.

13. The three-stage intracavity optical parametric oscillator/difference-frequency mixing structure of claim 1 wherein said second idler frequency is 3.3 $\mu$m.

14. The three-stage intracavity optical parametric oscillator/difference-frequency mixing structure of claim 1 wherein said second signal frequency is 1.57 $\mu$m.

15. A three-stage intracavity optical parametric oscillator/difference-frequency mixing structure for generation of three separate wavelengths and efficient pump to idler wave conversion comprising:
 (a) an optical pump source for providing a pump beam at a primary wavelength;
 (b) a multiply resonant cavity having an input end and an output end;
 (c) a monolithic non-linear optical medium having first, second and third regions disposed in said cavity for sustaining optical parametric oscillation and difference-frequency mixing, said monolithic non-linear optical medium comprising:
  (i) said first region having a first grating period adapted to operate an optical parametric oscillator and positioned at the input end of said cavity for receiving a coupled pump beam;
  (ii) said second region positioned between said first and third regions having a second grating period adapted to operate as a difference-frequency mixer wherein said first and second regions are adapted to produce a first signal frequency, a first idler frequency and a first difference-frequency; and
  (iii) said third region positioned at the output end of said cavity having a third grating period adapted to operate as an optical parametric oscillator wherein said third region is adapted to produce a second signal frequency and a second idler frequency;
 (d) an input mirror positioned at the input end of said cavity adapted to couple the pump beam into the resonant cavity through the monolithic non-linear optical medium and further adapted to be reflective of the first and second signal frequencies to resonate said first and second signal frequencies within the cavity; and
 (e) an output mirror having a surface partially reflective of said signal frequencies positioned at the output end of said cavity adapted to couple the difference-frequency and the first and second idler frequencies external to the cavity, and further adapted to be reflective of a portion of the first and second signal frequencies to prevent overdriving to resonate said remaining first and second signal frequencies within the cavity.

16. A three-stage optical parametric oscillator/difference-frequency mixing structure having mirrors intrinsically formed with nonlinear medium comprising:
 (a) an optical pump source for providing a pump beam at a primary wavelength;
 (b) a monolithic nonlinear optical medium having three periodic regions wherein a first region defines the pump beam entry surface area and a third region defines an exit surface area and second region is positioned between said first and third regions, said optical medium comprising:
  (i) said first region having a first grating period adapted to operate as an optical parametric oscillator for receiving a coupled pump beam;
  (ii) said second region positioned between said first and third regions having a second grating period adapted to operate as a difference-frequency mixer wherein said first and second regions are adapted to produce a first signal frequency, a first idler frequency and a first difference-frequency; and
  (iii) said third region having a third grating period adapted to operate as an optical parametric oscillator wherein said third region is adapted to produce a second signal frequency and a second idler frequency;
 (c) a first mirrored coating affixed to the entry surface area of the monolithic optical medium adapted to couple the pump beam through the monolithic nonlinear optical medium and adapted to reflect said first and second signal frequencies and to resonate said first and second signal frequencies; and
 (d) a second mirrored coating having a surface partially reflective of said signal frequencies affixed to the exit surface area of said nonlinear optical medium adapted to couple the first and second idler frequencies and the difference-frequency external to the optical medium and further adapted to reflect a portion of said first and second signal frequencies to prevent overdriving and to resonate said remaining first and second signal frequencies.

17. The optical parametric oscillator/difference-frequency mixing structure of claim 16 wherein said nonlinear optical medium is a PPLN crystal.

\* \* \* \* \*